US011189421B2

(12) United States Patent
Ranedo Torres et al.

(10) Patent No.: US 11,189,421 B2
(45) Date of Patent: Nov. 30, 2021

(54) PHASE AND ZERO-SEQUENCE CURRENT SENSING MODULES MOUNTED TOGETHER ON A CABLE BUSHING

(71) Applicants: Ormazabal Protection & Automation, S.L.U., Igorre (ES); Ormazabal Y CIA., S.L.U., Igorre (ES)

(72) Inventors: Luis Ranedo Torres, Igorre (ES); Miguel Alvarez Escalona, Igorre (ES); Jose Luis Sabas Fernandez, Igorre (ES); Juan Antonio Sanchez Ruiz, Igorre (ES)

(73) Assignees: ORMAZABAL PROTECTION & AUTOMATION, S.L.U., Igorre (ES); ORMAZABAL Y CIA., S.L.U., Igorre (ES)

( * ) Notice: Subject to any disclaimer, the term of this patent is extended or adjusted under 35 U.S.C. 154(b) by 147 days.

(21) Appl. No.: 16/345,134

(22) PCT Filed: Oct. 26, 2017

(86) PCT No.: PCT/ES2017/070717
§ 371 (c)(1),
(2) Date: Apr. 25, 2019

(87) PCT Pub. No.: WO2018/078207
PCT Pub. Date: May 3, 2018

(65) Prior Publication Data
US 2019/0287718 A1  Sep. 19, 2019

(30) Foreign Application Priority Data
Oct. 28, 2016  (EP) .................................... 16382491

(51) Int. Cl.
*H01F 27/40* (2006.01)
*H01R 13/53* (2006.01)
(Continued)

(52) U.S. Cl.
CPC ........... *H01F 27/402* (2013.01); *H01F 38/30* (2013.01); *H01R 13/53* (2013.01); *H02B 13/0356* (2013.01); *H01F 27/04* (2013.01)

(58) Field of Classification Search
CPC ........ H01F 27/402; H01F 27/04; H01F 38/30; H01F 27/40; H02B 13/0356;
(Continued)

(56) References Cited

U.S. PATENT DOCUMENTS

| 6,362,445 B1* | 3/2002 | Marchand ......... H02B 13/0354 218/155 |
| 2012/0001645 A1* | 1/2012 | Javora ................. G01R 15/142 324/658 |
| 2016/0072270 A1* | 3/2016 | Rostron ................ H02H 3/081 700/294 |

FOREIGN PATENT DOCUMENTS

| CN | 103578724 A | 2/2014 |
| CN | 203895829 U | 10/2014 |

(Continued)

OTHER PUBLICATIONS

PCT/ES2017/070717 International Search Report dated Feb. 13, 2018.

*Primary Examiner* — Douglas X Rodriguez
*Assistant Examiner* — Trung Q Nguyen
(74) *Attorney, Agent, or Firm* — Wagenknecht IP Law Group PC

(57) ABSTRACT

A current sensing modular system, which allows sensing the phase current and/or the around-fault or zero-sequence current, having to that end at least a first module having at least one phase current sensor embedded therein and a second module having a zero-sequence current sensor embedded therein. The first module is independent of the second module, both modules being installed directly in the connection elements, i.e., in the connection point between at
(Continued)

least one bushing and at least one connector of at least one grid cable.

18 Claims, 6 Drawing Sheets

(51) Int. Cl.
    *H01F 38/30*     (2006.01)
    *H02B 13/035*     (2006.01)
    *H01F 27/04*     (2006.01)

(58) Field of Classification Search
    CPC ...... H02B 13/035; H01R 13/53; H01R 24/78;
        H01R 31/065; G01R 15/18; G01R 15/24;
        G01R 15/242; G01R 15/185; G01R 15/14
    USPC .......................................... 324/122–131, 138
    See application file for complete search history.

(56) References Cited

FOREIGN PATENT DOCUMENTS

| | | |
|---|---|---|
| DE | 102015104204 A1 | 9/2015 |
| EP | 2402769 A1 | 1/2012 |
| ES | 436863 A1 | 1/1977 |
| KR | 101269617 B1 | 6/2013 |
| WO | 2004/040728 A1 | 5/2004 |
| WO | 2015/064118 A1 | 2/2014 |
| WO | 2018/064118 A1 | 4/2018 |

\* cited by examiner

PHASE AND ZERO-SEQUENCE CURRENT SENSING MODULES MOUNTED TOGETHER ON A CABLE BUSHING

CROSS REFERENCE TO RELATED APPLICATIONS

This application is a US national phase application under 35 USC § 371 of International Patent Application No. PCT/ES2017/070717, filed Oct. 26, 2017, which claims priority to European Patent Application No. 16382491.5, filed Oct. 28, 2016. Each of the applications referred to in this paragraph are herein incorporated by reference in their entireties herein.

BACKGROUND OF THE INVENTION

High-voltage electrical switchgear may contain therein electrical equipment referred to as switchgears which are provided with different compartments, such as for example the bus bar compartment, switch compartment, cable compartment, etc. Grid cables go into the cable compartment and they are connected in the same compartment to the electrical equipment or switchgear, establishing an isolated and shielded connection, specifically a connection is established between at least one bushing of the switchgear and at least one connector of the grid cable. Likewise, current and/or voltage sensors are usually installed in the cable compartment, providing low-signal current and voltage values proportional to the amplitude of the current and voltage values of the high-voltage part. These current and voltage values are treated and processed in an electronic data acquisition system for protection, measurement and/or control.

Generally, current sensing in the cable compartment is carried out by means of inductive toroidal sensors. The phase current and ground-fault or zero-sequence current can thereby be sensed. Phase current sensors are integrated directly in the connection elements, i.e., the sensors are installed covering each of the phases in the connection point between the bushing of the switchgear and the connectors of the grid cables.

In this regard, several patent documents can be mentioned, such as CN203895829U, WO2004040728A1 and ES436863A1, for example, which define solutions with phase current sensors installed on the connection elements.

The ground-fault or zero-sequence current is obtained from a sensor also installed in the cable compartment, installed precisely on the grid cables, covering all the phases (as shown in the example of FIG. 1 corresponding to the state of the art) by means of a sensor. This involves the drawback that zero-sequence current sensors have to be installed and field tested to avoid any installation error. Furthermore, if the zero-sequence current sensor has to be replaced, the connector must first be uninstalled from the cable, and then be installed again later once said current sensor has been replaced. This involves consuming a lot of time until restoring power to consumers, worse supply quality, costs for the supply company, trouble for clients, etc.

Sometimes it is impossible to install the zero-sequence current sensor in the same point as the phase current sensors, since these sensors require certain space, which leaves no free space to install the zero-sequence current sensor. In this regard, patent document DE102015104204A1 can be mentioned, and in said document it can be seen that the three phase current sensors are not mounted on the same plane, at least one sensor being in front of the plane of assembly of the two other sensors, so the space occupied by the three phase current sensors assembly is large enough leaving no some room for assembling the zero-sequence current sensor, which has to be installed on the grid cables themselves, as shown in FIG. 1 of the state of the art.

There are solutions in which the zero-sequence current sensor can be installed together with the phase current sensors. In this sense, the solution defined in patent document KR101269617B1 can be mentioned, and in said document the bushings are arranged in a staggered pattern, thereby being able to mount the three phase current sensors on the same plane of assembly, therefore leaving enough space to install a zero-sequence current sensor in the same point.

Another example of the state of the art is defined in patent document WO2015064118A1, which describes a support or module in which the phase current sensors and the zero-sequence current sensor can be incorporated, both the sensors and the module itself being integrated in an insulating material as a single part, therefore being able to install the module in the connection point between the bushing of the switchgear and the connectors of the grid cables. This last example has the drawback that both the phase current sensors and the zero-sequence current sensor are integrated in one and the same module, which involves having to replace the entire module due to the poor condition of one of the two sensors, as well as the impossibility of installing the different sensors at different times.

The connectors of the grid cables can be screw-in or plug-in type connectors. In the case of plug-in connectors, they require a fixing element comprising at least one hairpin fastener that is coupled in a support which is attached at the same time to the wall of the switchgear. Said hairpin fastener must go through the inside of the phase current sensor, which requires the toroidal phase current sensor to have a larger inner diameter, and therefore there has to be more space for installing the phase current sensors, which even further complicates installing the zero-sequence current sensor in that same point.

Furthermore, little space entails the drawback that current sensors are less precise, i.e., the transformation ratio, the measurement range, the precision power and the saturation current are subjected to the space available for mounting the current sensors, and therefore in designs available today, current sensor performance is limited.

SUMMARY OF THE INVENTION

The present invention relates to a phase and/or zero-sequence current sensing system to be applied in high-voltage electrical switchgear, with the feature that the sensing system comprises modules that are independent from one another, installed in the connection point between at least one bushing and at least one connector.

The current sensing modular system is provided for being installed in the connection of the grid cables with the switchgear, in an isolated and shielded manner, specifically in the connection point between at least one bushing and at least one connector of at least one grid cable, solving the drawbacks mentioned above.

The modular system of the present invention provides phase and/or ground-fault or zero-sequence current values. To that end, the system comprises at least a first module incorporating at least one current sensor for sensing the phase current embedded in an insulating material, which can comprise at least one lateral sensed phase current signal output, said first module being able to be single-phase or three-phase, i.e., there can be one module for each phase or a single module for the three phases, the module in this final case having three current sensors and the phases are separated from one another.

This modular system can also provide ground-fault or zero-sequence current values, comprising to that end at least a second module, independent of the first module, incorporating at least one zero-sequence current sensor embedded in an insulating material, and covering all the phases for sensing the zero-sequence current. Given that the first and second modules are independent from one another, this inter-module independence means that it is not necessary to replace the entire modular system, if circumstances required having to replace, add or remove any of them.

The first module and/or the second module are installed directly in the connection elements, i.e., in the connection point between at least one bushing and at least one connector of at least one grid cable. For installing the modules, the system of the present invention comprises a support in said connection point which can be connected to the ground potential of the bushing or isolated from said ground potential. The modular system of the present invention is factory-installed, set and checked, such that field assembly and connecting tasks are eliminated, which eliminate installation errors and reduces labor time and cost for the installation.

The first module can be single-phase, such that there is one module for each phase for sensing the phase current. The system also comprises a second module for sensing the zero-sequence current, covering all the phases by means of this second module. In this case, the second module comprises an inclined ring shape and is arranged around the at least one connector, thereby allowing the installation thereof next to the first module. The grid cable connectors which can be used in this case are screw-in connectors.

The first module can be three-phase, such that there can be a single module comprising a parallelogram shape, such as rectangular, for example, in which each of the phases is separated from the other one. This first three-phase module can comprise embedded therein three phase current sensors, which can comprise independent cores or laminated cores made of metal sheets arranged in a C-shape, the three cores being assembled with one another in this last case. All the phase current sensors are integrated inside the first module, so all of them are mounted on the same plane, there being no sensor arranged in front of or behind the others, thereby minimizing the space required for the installation thereof, and therefore being able to install the first module next to a second module comprising a zero-sequence current sensor which covers all the phases embedded therein.

In the particular case of phase current sensors comprising a laminated core made of metal sheets, the transformation ratio and the precision class can be set based on the number of metal sheets and the height of the sensor (length of the metal sheets), so the winding of the core can be more or less. Likewise, by means of arranging of the metal sheets in a C-shape, core winding tasks are made easier, such that each of the sensors can be wound separately first and then the sensors can be assembled to one another.

In summary, the modular system of the present invention allows considerably improving the transformation ratio, the measurement range, the precision power and the saturation current with respect to conventional designs, taking up the same useful space in the switchgear or electrical equipment.

In the embodiment in which the first module is three-phase, the modular system can be used with both screw-in and plug-in cable connectors, since the parallelogram shape of the first module allows the passage of the fixing element in the case of plug-in connectors.

Finally, it has been envisaged that the first and second module comprising the current sensors integrated therein can consist of shells comprising the current sensors embedded therein in an insulating material, such as epoxy resin, for example.

DESCRIPTION OF PREFERRED EMBODIMENTS

Several preferred embodiments are described below in reference to the drawings mentioned above, without this limiting or reducing the scope of protection of the present invention.

FIGS. 2-4 and 7-8 show different embodiments of the current sensing modular system object of the present invention.

Figure 1:
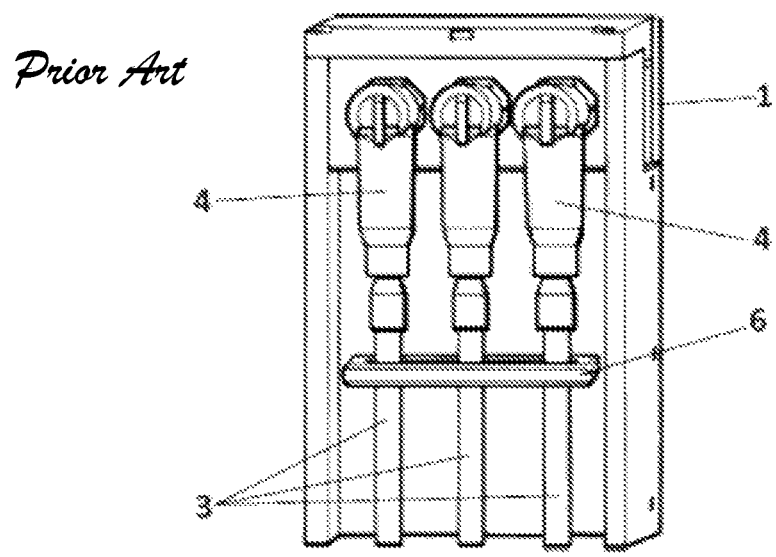
FIG. 1 shows a perspective view of the installation of a zero-sequence current sensor according to the current state of the art.
Figure 2:
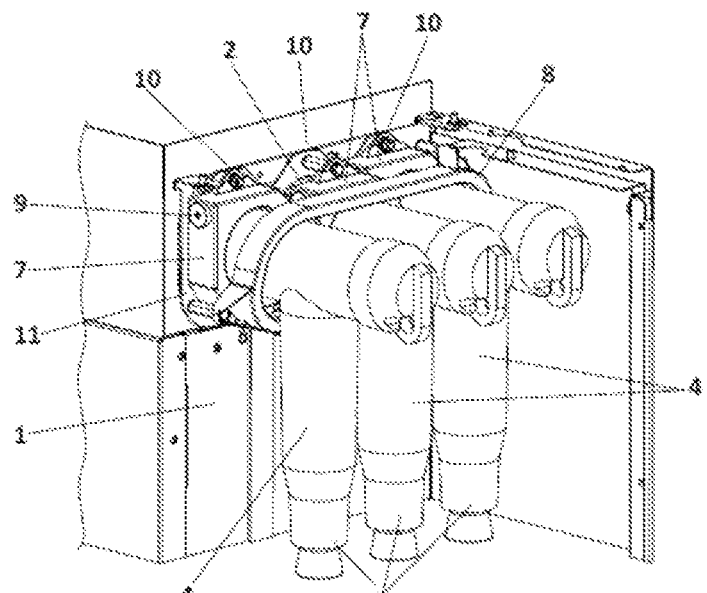
FIG. 2 shows a perspective view of the modular system object of the present invention according to a first embodiment, in which the grid cable connectors are screw-in connectors.

FIG. 2 shows a first embodiment in which the modular system comprises at least one phase current sensor (5) for sensing the phase current embedded in at least a first module (7) and a zero-sequence current sensor (6) for sensing the zero-sequence current embedded in a second module (8).

According to this first embodiment, the first module (7) is single-phase and comprises a phase current sensor (5) embedded therein, so at least one module (7) is installed for each phase (10). This first module (7) can comprise a lateral output (9) for extracting the sensed phase current signal. A second module (8) is installed next to this first module (7), independently of said first module (7), comprising a zero-sequence current sensor (6) embedded therein and covering all the phases (10) for sensing the zero-sequence current.

Figure 10:
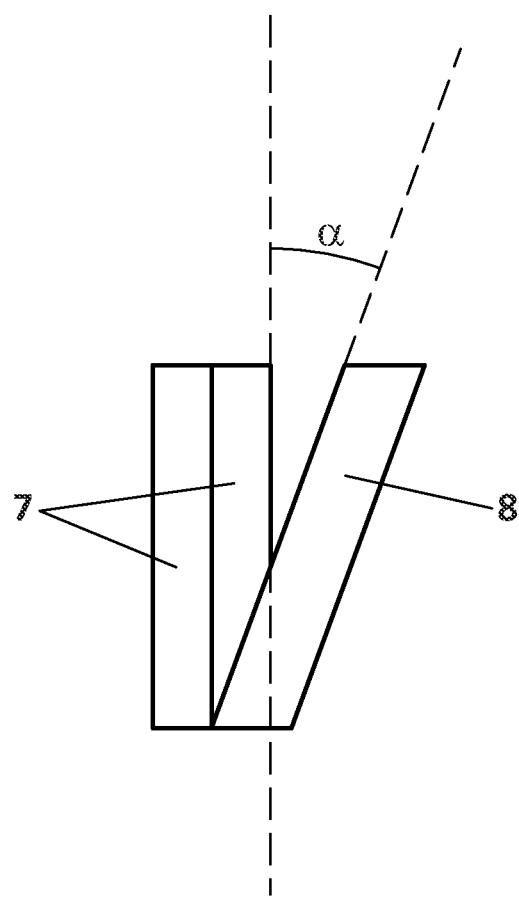
FIG. 10 shows a schematic side view of the modular system according to the first embodiment of FIG. 2, in which a particular inclination of the second module is seen.

It has therefore been envisaged that said second module (8) has an inclined ring shape and is arranged around the at least one connector (4), such that both modules (7, 8) can be mounted directly in the connection point between at least one bushing (2) of a compartment (1) of grid cables (3) and at least one connector (4) of at least one cable (3). This inclination of the second module (8), shown more clearly in FIG. 10, in which the upper segment is in the outermost position, or if preferred, in front of the lower segment, forming an angle (a) with respect to an imaginary vertical axis, is not a trivial or random feature, but rather pursues a well-determined, specific objective, allowing optimal coupling and mounting between both modules (7, 8). More particularly, it can be seen in FIG. 2 that the placement of the first module (7) located in the central position with respect to the two other first modules (7) requires fitting and inclining the second module (8).

On the other hand, as shown in FIG. 2, the first module (7) and the second module (8) are mounted on a support (11) arranged in the connection point between the bushing (2) and the screw-in type connector (4).

Figure 3:
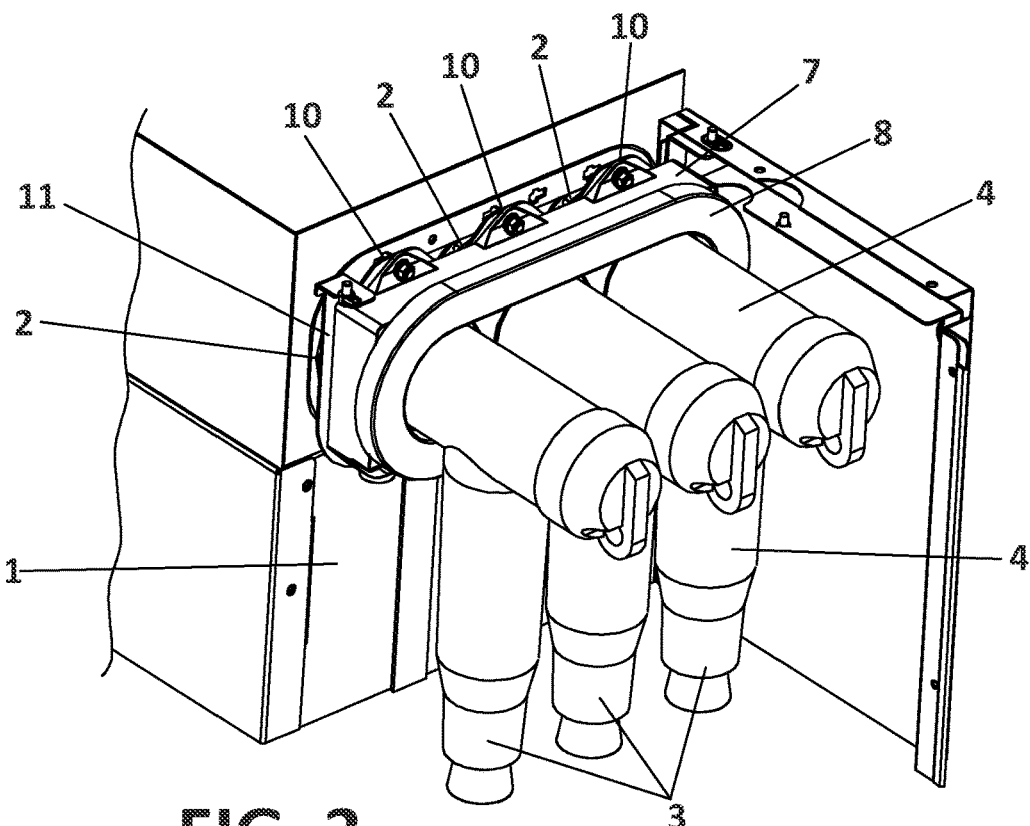
FIG. 3 shows a perspective view of the modular system object of the present invention according to a second embodiment, in which the grid cable connectors are screw-in connectors.
Figure 4:
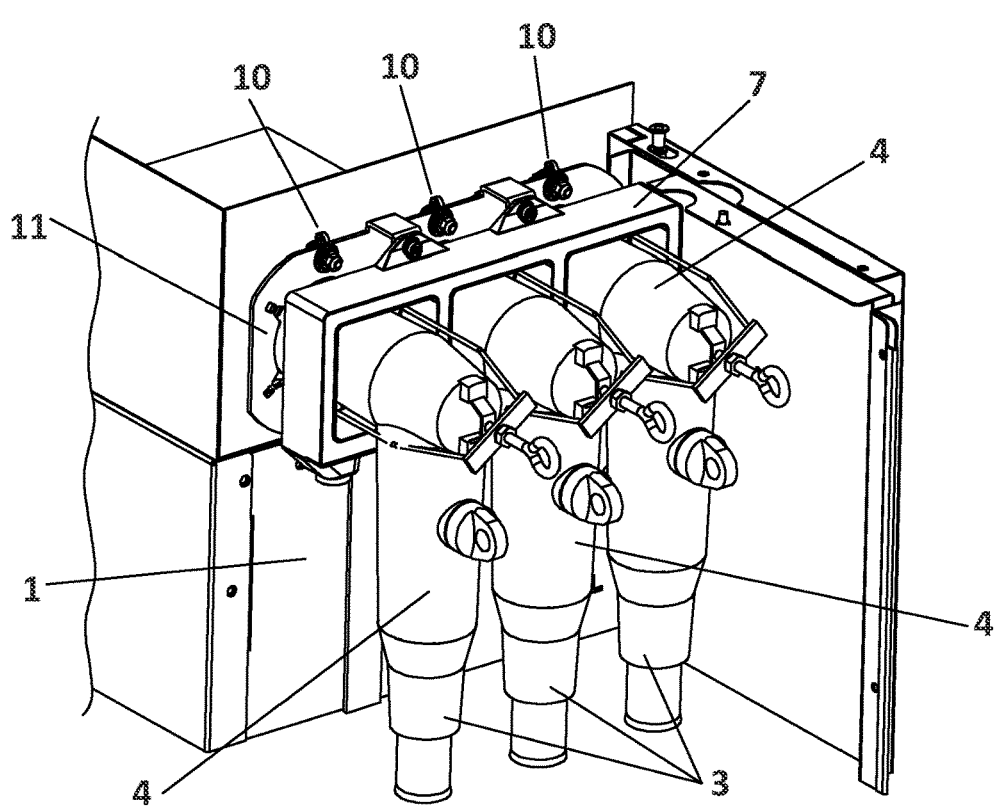
FIG. 4 shows a perspective view of the modular system of FIG. 3, without including the second module for the purpose of better depicting the rectangular configuration of the first module, wherein the grid cable connectors are plug-in connectors.

According to a second possible embodiment, depicted in FIGS. 3 and 4, the first module (7) is three-phase and has three phase current sensors (5) embedded in one and the same part or block for sensing the current of each phase (10). The first module (7) can have a parallelogram shape; specifically, in the examples of FIGS. 3 and 4 the first module (7) is shown having a rectangular shape.

Figure 5:
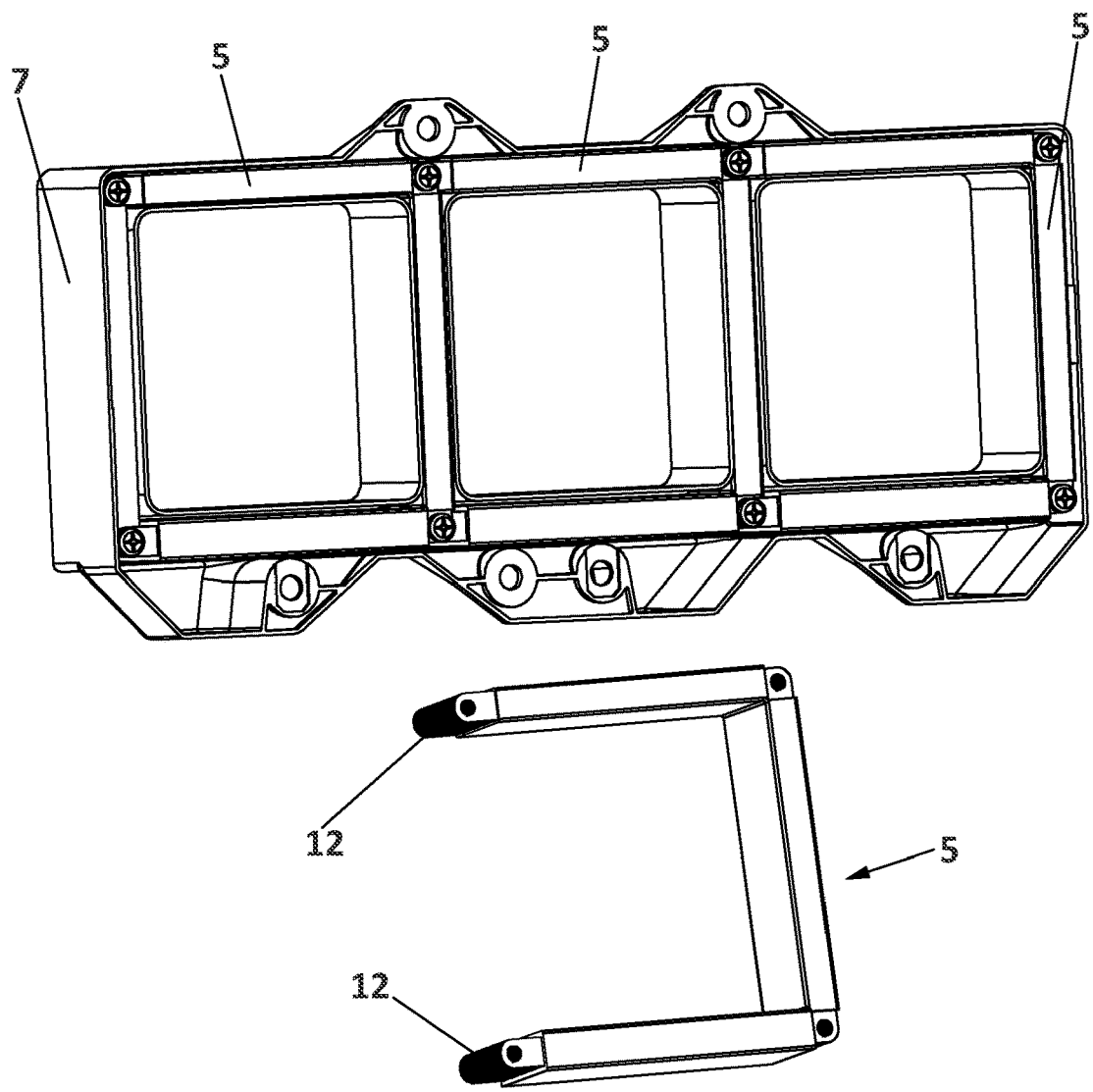
FIG. 5 shows a perspective view of the first module and its respective phase current sensors according to the second embodiment of FIGS. 3 and 4.
Figure 6:
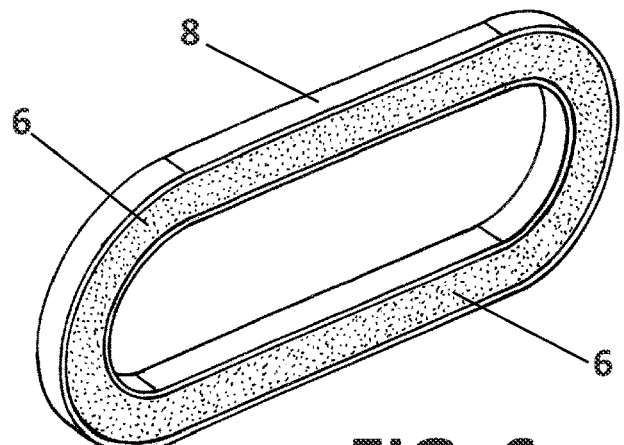
FIG. 6 shows a perspective view of the second module, in which the zero-sequence current sensor according to the second embodiment of FIGS. 3 and 4 is seen.

The three phase current sensors (5) are therefore embedded inside the first module (7), and therefore all the sensors are mounted on the same plane, unlike the first embodiment described above. These phase current sensors (5) comprise a laminated core (12) made of metal sheets arranged in a C-shape, as shown in FIG. 5, so each of the phase current sensors (5) can be wound separately and then they can be assembled to one another. There is mounted next to the first module (7) a second module (8), shown in FIGS. 3 and 6, comprising a zero-sequence current sensor (6) embedded therein which covers all the phases (10) for sensing the zero-sequence current. Both modules (7, 8) are mounted on a support (11) arranged in the connection point between the bushing (2) and the connectors (4), which are screw-in type connectors (4) in the case of FIG. 3 and plug-in type connectors (4) in the case of FIG. 4. Here it should be indicated that the second module (8) is not depicted in FIG. 4 for the purpose of better depicting the special rectangular configuration of the first module (7).

Figure 7:
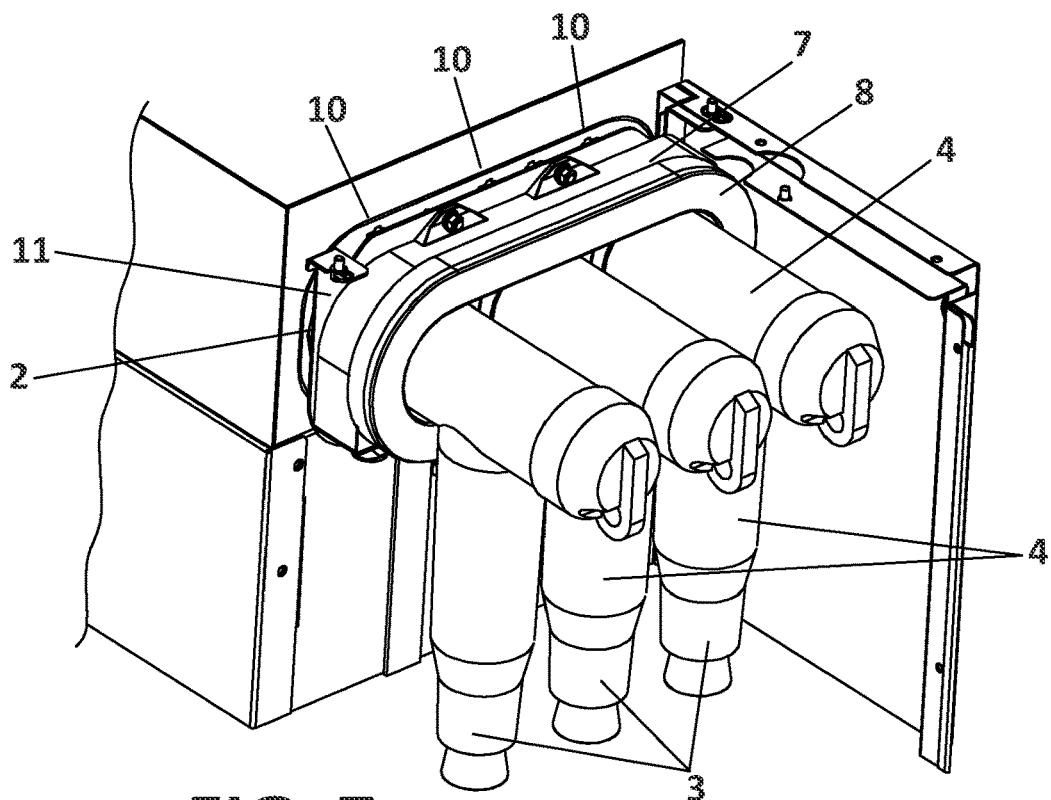
FIG. 7 shows a perspective view of the modular system object of the present invention according to a third embodiment, in which the grid cable connectors are screw-in connectors.
Figure 8:
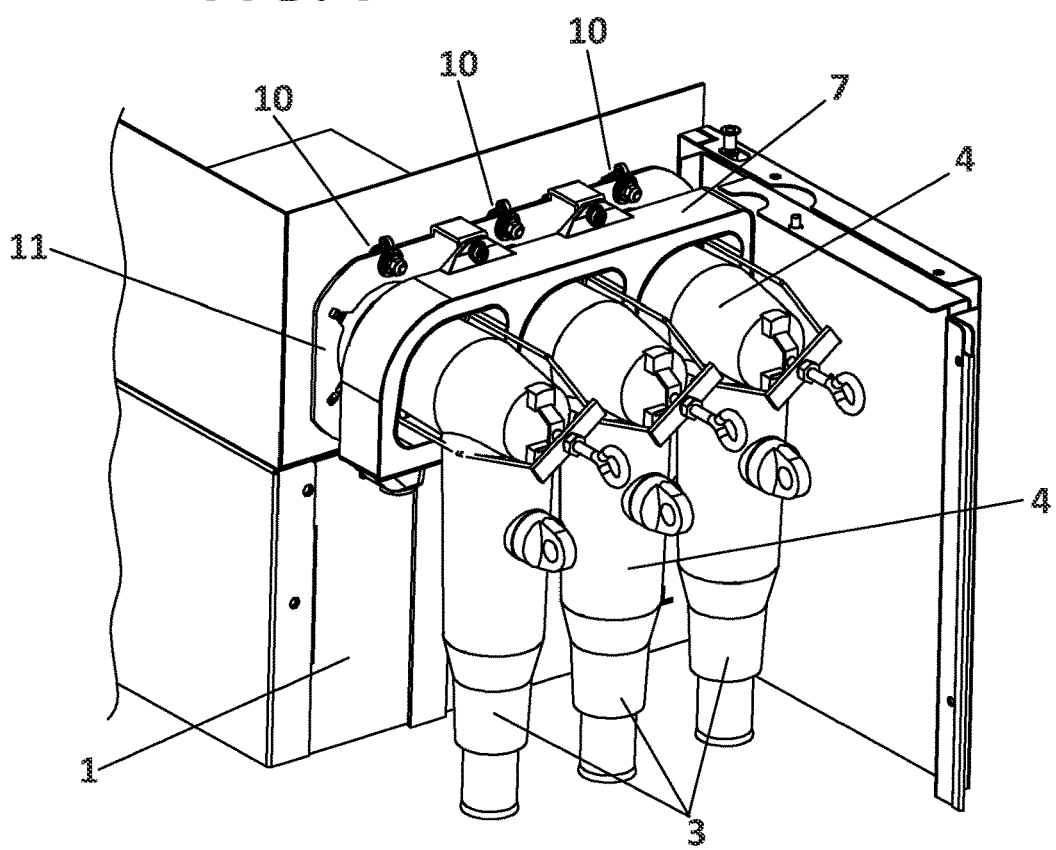
FIG. 8 shows a perspective view of the modular system of FIG. 7, without including the second module to better show the particular configuration of the first module, wherein the grid cable connectors are plug-in connectors.
Figure 9:
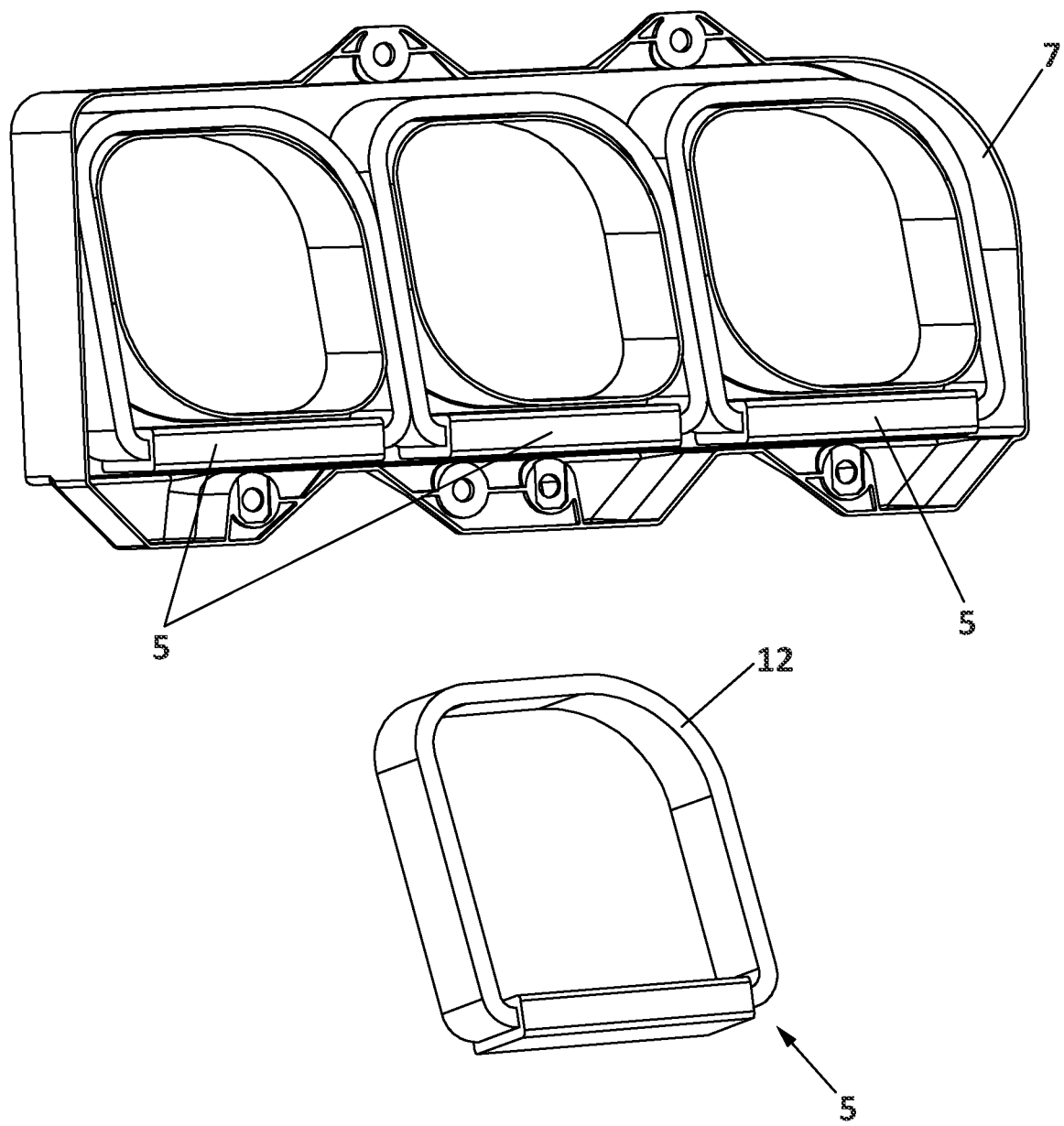
FIG. 9 shows a perspective view of the phase current sensors according to the third embodiment of FIGS. 7 and 8.

According to a third possible embodiment shown in FIGS. 7 and 8, the first module (7) is three-phase and has three phase current sensors (5) embedded in one and the same part or block for sensing the current of each phase (10). The first module (7) can have a parallelogram shape, specifically in the examples of FIGS. 7 and 8 the first module (7) is shown to have a rectangular shape. The three phase current sensors (5) are embedded in the first module (7), and therefore all the sensors are mounted on the same plane. Said phase current sensors (5) comprise independent cores (12), as seen in FIG. 9. There is mounted next to the first module (7) a second module (8) comprising a zero-sequence current sensor (6) embedded therein which covers all the phases (10) for sensing the zero-sequence current. Both modules (7, 8) are mounted on a support (11) arranged in the connection point between the bushing (2) and the connectors (4), which are screw-in type connectors (4) in the case of FIG. 7 and plug-in type connectors (4) in the case of FIG. 8. Similarly, it should be pointed out that the second module (8) is not depicted in FIG. 8 to better show the particular configuration of the first module (7).

In all the possible embodiments, the support (11) in which the first module (7) and second module (8) are mounted is arranged in the connection point between the bushing (2) and the grid cable connectors (4). This support (11) can be connected to the ground potential itself of the bushing (2) or it can be isolated from said ground potential.

Finally, in all the possible embodiments of the invention, the modules (7, 8) are shells comprising at least one current sensor (5, 6) embedded therein in an insulating material, such as epoxy resin.

What is claimed is:

1. A modular mounting arrangement with a modular phase and zero-sequence current sensing system configured to be arranged in a high-voltage electrical switchgear including at least a cable compartment (1) provided with at least one bushing (2) with which a cable (3) can be connected through a connector (4), characterized in that the modular system comprises at least one phase current sensor (5) for sensing the phase current, said phase current sensor (5) being embedded in at least a first module (7); and at least one zero-sequence current sensor (6) for sensing the zero-sequence current, said zero-sequence current sensor (6) being embedded in at least a second module (8); so that the first module (7) is independent of the second module (8); and wherein the first module (7) and the second module (8) are mounted directly in a connection point between the at least one bushing (2) of the high-voltage electrical switchgear and at least one connector (4) of at least one grid cable (3);

wherein the first module (7) and the second module (8) are mounted on a support (11) arranged in the connection point between the bushing (2) and the connector (4); and wherein the first module (7) is single-phase, at least a first module (7) being installed for each phase (10).

2. The modular mounting arrangement according to claim 1, characterized in that the first module (7) is three-phase.

3. The modular mounting arrangement according to claim 2, characterized in that the first module (7) has a parallelogram shape.

4. The modular mounting arrangement according to claim 3, characterized in that the phase current sensors (5) comprise at least one laminated core (12) made of metal sheets arranged in a C-shape; the cores (12) being assembled to one another.

5. The modular mounting arrangement according to claim 3, characterized in that the phase current sensors (5) have independent cores (12).

6. The modular mounting arrangement according to claim 5, characterized in that the support (11) is connected to the ground potential of the bushing (2).

7. The modular mounting arrangement according to claim 5, characterized in that the support (11) is isolated from the ground potential of the bushing (2).

8. The modular mounting arrangement according to claim 5, characterized in that the first module (7) and the second module (8) are shells having at least one current sensor (5, 6) embedded therein in an insulating material.

9. The modular mounting arrangement according to claim 3, characterized in that the connector (4) that is coupled in the bushing (2) is a plug-in type connector.

10. The modular mounting arrangement according to claim 2, characterized in that the zero-sequence current sensor (6) of the second module (8) covers all the phases (10).

11. The modular mounting arrangement according to claim 2, characterized in that the connector (4) that is coupled in the bushing (2) is a screw-in type connector.

12. The modular mounting arrangement according to claim 1, characterized in that the first module (7) has a lateral sensed phase current signal output (9).

13. The modular mounting arrangement according to claim 12, characterized in that the second module (8) has an inclined ring shape and is arranged around the at least one connector (4).

14. The modular mounting arrangement according to claim 1, characterized in that the zero-sequence current sensor (6) of the second module (8) covers all the phases (10).

15. The modular mounting arrangement according to claim 1, characterized in that the connector (4) that is coupled in the bushing (2) is a screw-in type connector.

16. The modular mounting arrangement according to claim 1, characterized in that the support (11) is connected to the ground potential of the bushing (2).

17. The modular mounting arrangement according to claim 1, characterized in that the support (11) is isolated from the ground potential of the bushing (2).

18. The modular mounting arrangement according to claim 1, characterized in that the first module (7) and the second module (8) are shells having at least one current sensor (5, 6) embedded therein in an insulating material.

\* \* \* \* \*